United States Patent
Lee et al.

(10) Patent No.: US 9,935,768 B2
(45) Date of Patent: Apr. 3, 2018

(54) PROCESSORS INCLUDING KEY MANAGEMENT CIRCUITS AND METHODS OF OPERATING KEY MANAGEMENT CIRCUITS

(71) Applicant: Samsung Electronics Co., Ltd., Suwon-si (KR)

(72) Inventors: Hyesoo Lee, Seongnam-si (KR); Jaechul Park, Seoul (KR); Yun-Ho Youm, Seoul (KR); Kyungae Kim, Seoul (KR); TongPyo Hong, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 167 days.

(21) Appl. No.: 14/251,120

(22) Filed: Apr. 11, 2014

(65) Prior Publication Data

US 2014/0219445 A1 Aug. 7, 2014

Related U.S. Application Data

(63) Continuation-in-part of application No. 13/956,592, filed on Aug. 1, 2013, now Pat. No. 9,094,190.

(60) Provisional application No. 61/885,840, filed on Oct. 2, 2013.

(30) Foreign Application Priority Data

Aug. 6, 2012 (KR) .................. 10-2012-0085892
Aug. 30, 2013 (KR) .................. 10-2013-0104382

(51) Int. Cl.
*H04L 29/06* (2006.01)
*H04L 9/08* (2006.01)

(52) U.S. Cl.
CPC .......... *H04L 9/0894* (2013.01); *H04L 9/0869* (2013.01)

(58) Field of Classification Search
CPC .... H04L 9/0816; H04L 9/0869; H04L 9/0894
USPC .................................................. 380/46, 277
See application file for complete search history.

(56) References Cited

U.S. PATENT DOCUMENTS

| 5,343,527 | A | * | 8/1994 | Moore | .................. G06F 21/16 380/30 |
|---|---|---|---|---|---|
| 5,764,772 | A | * | 6/1998 | Kaufman | ................ H04L 9/088 380/286 |
| 6,707,914 | B1 | * | 3/2004 | Bell | .......................... H04L 9/12 380/265 |
| 7,305,567 | B1 | | 12/2007 | Hussain et al. | |
| 7,392,401 | B2 | | 6/2008 | Kohara et al. | |

(Continued)

FOREIGN PATENT DOCUMENTS

JP  2009-032003  2/2009
JP  2009-128792  6/2009

(Continued)

OTHER PUBLICATIONS

Guo, "Efficient and dynamic key management for multiple identities in identity-based systems", Sep. 2012, Elsevier-Information Sciences, pp. 579-590.*

*Primary Examiner* — Taghi Arani
*Assistant Examiner* — Gregory Lane
(74) *Attorney, Agent, or Firm* — Ward and Smith, P.A.

(57) ABSTRACT

A system on chip includes a central processing unit and a key manager coupled to the central processing unit. The key manager includes a random number generator configured to generate a key and a key memory configured to store the key and a user setting value associated with the key.

19 Claims, 15 Drawing Sheets

(56) References Cited

U.S. PATENT DOCUMENTS

| | | |
|---|---|---|
| 7,471,792 B2 | 12/2008 | Yamamichi et al. |
| 7,546,461 B2 | 6/2009 | Yuval et al. |
| 7,668,310 B2 | 2/2010 | Kocher et al. |
| 7,873,168 B2 | 1/2011 | Tateoka et al. |
| 7,945,776 B1 | 5/2011 | Atzmony et al. |
| 7,996,683 B2 | 8/2011 | Lyseggen et al. |
| 8,467,534 B2 | 6/2013 | Patariu et al. |
| 2004/0109568 A1* | 6/2004 | Slick .................... G06F 21/608 380/277 |
| 2005/0190913 A1* | 9/2005 | Wada .................... G06F 7/588 380/44 |
| 2006/0078109 A1* | 4/2006 | Akashika .............. G06F 21/602 380/30 |
| 2006/0242415 A1* | 10/2006 | Gaylor .................. G06F 21/31 713/176 |
| 2006/0248346 A1 | 11/2006 | Shiomi et al. |
| 2007/0005974 A1* | 1/2007 | Kudou .................. G06F 21/606 713/171 |
| 2009/0106561 A1* | 4/2009 | Ejiri ...................... G06F 21/62 713/193 |
| 2009/0110192 A1* | 4/2009 | Elrod ................... H04L 9/0866 380/44 |
| 2009/0245522 A1* | 10/2009 | Kudo ................... H04L 9/0894 380/280 |
| 2010/0172496 A1 | 7/2010 | Furukawa |
| 2010/0172503 A1 | 7/2010 | Neumann et al. |
| 2010/0329455 A1 | 12/2010 | Nemiroff |
| 2011/0113245 A1 | 5/2011 | Varadarajan |
| 2011/0252243 A1 | 10/2011 | Brouwer et al. |
| 2012/0155637 A1* | 6/2012 | Lambert ............... H04L 9/0863 380/44 |
| 2013/0007467 A1* | 1/2013 | Chan ...................... G06F 21/10 713/189 |
| 2013/0031365 A1 | 1/2013 | Park et al. |
| 2013/0212385 A1* | 8/2013 | Schechter ............. G06F 21/31 713/168 |

FOREIGN PATENT DOCUMENTS

| | | |
|---|---|---|
| KR | 1020090065415 A | 6/2009 |
| KR | 1020100009301 A | 1/2010 |
| KR | 1020130048508 A | 5/2013 |

* cited by examiner

PROCESSORS INCLUDING KEY MANAGEMENT CIRCUITS AND METHODS OF OPERATING KEY MANAGEMENT CIRCUITS

CROSS-REFERENCE TO RELATED APPLICATIONS

This U.S. non-provisional patent application is a continuation-in-part of U.S. patent application Ser. No. 13/956,592 filed on Aug. 1, 2013, which claims priority under 35 U.S.C. § 119 to Korean Patent Application No. 10-2012-0085892 filed on Aug. 6, 2012, in the Korean Intellectual Property Office. This application also claims the benefit of and priority to U.S. Provisional Application Ser. No. 61/885,840 filed on Oct. 2, 2013. This application also claims priority under 35 U.S.C. § 119 to Korean Patent Application No. 10-2013-0104382 filed on Aug. 30, 2013, in the Korean Intellectual Property Office. The disclosures of each of the above-referenced applications are incorporated herein by reference.

BACKGROUND

The inventive concepts described herein relate to semiconductor devices, and more particularly, relate to processors including key management circuits and methods of operating key management circuits.

As semiconductor manufacturing techniques improve, the performance of personal electronic devices, such as personal computers, notebook computers, smart phones, smart pads, etc. has become more highly developed.

The information stored and processed on a personal electronic device may include personal information, confidential information, or other sensitive information. For example, a personal electronic device may store personal information (e.g., note, diary, etc.), personal financial information (e.g., certificate, credit card settlement information, etc.) and the like. Unintended disclosure of such information, such as disclosure due to hacking, can be highly damaging to a user of the device.

Encryption and decryption schemes are used to improve security of the contents stored on a person electronic device. With the encryption and decryption schemes, data to be stored in the person electronic device is encrypted, and the encrypted data may be decrypted when the person electronic device uses the data. Unintended disclosure of personal information may be avoided by encrypting the data and storing encrypted data.

However, hacking techniques are constantly being developed that may be capable of incapacitating the encryption and decryption schemes. Thus, there is an increasing demand for encryption and decryption schemes that are capable of blocking hacking attempts and implementing a high level of security.

SUMMARY

A system on chip according to some embodiments includes a central processing unit and a key manager coupled to the central processing unit. The key manager includes a random number generator configured to generate a key, a key memory configured to store the key and a user setting value associated with the key, an unique value storage configured to provide the fixed value, wherein the fixed value is unique to the chip and secure value, and a key derivation function configured to generate key using a user setting value and fixed value.

The user setting value may include a first user setting value, the key manager may further include a user setting value register configured to store a second user setting value, and a controller configured to control use of the key in response to a comparison of the first user setting value and the second user setting value.

The key memory may includes a decrypted key memory, and the key manager may be configured to generate a hash value based on the key, the salt bit which is random value and the first user setting value, to generate an encrypted key by encrypting the hash value and the key using a fixed secure value, and to store the encrypted key in an encrypted key memory.

The key manager may further include a unique value storage configured to provide the fixed value. The fixed value may be unique to the system on chip. The fixed value is provided to a key manager core without traversing a host interface.

The key manager may be configured to generate the hash value based on a random salt value in addition to the key and the first user setting value, and to generate the encrypted key by encrypting the hash value, the key and the random salt value using the fixed value.

The key manager may further include a cipher block configured to receive the hash value, the key, the random salt value, and the fixed value, and to generate the encrypted key by performing an encryption operation on the hash value, the key and the random salt value using the fixed value.

The key manager may further include a hash generator configured to receive the random salt value, the first user setting value and the key to the hash generator, and to generate the hash value by performing a hash operation on the random salt value, the first user setting value and the key.

The key manager may further include a random number generator that is configured to generate the key. The random number generator may be configured to provide the key to the controller without the key traversing a host interface.

The key manager may further include a user check block that compares the first user setting value and the second user setting value.

A method of operating a key manager according to some embodiments includes generating and storing a key in a key memory, and storing a user setting value in the key memory, so that the user setting value is associated with the key.

The user setting value may include a first user setting value, and the method may further include receiving a second user setting value from a host, comparing the first user setting value with a second user setting value, and controlling use of the key based on a result of the comparison of the first user setting value and the second user setting value.

The key memory may include a decrypted key memory, and the method may further include generating a hash value based on the key and the first user setting value, generating an encrypted key by encrypting the hash value and the key using a fixed value, and storing the encrypted key in an encrypted key memory.

The method may further include obtaining the fixed value from a unique value storage. The fixed value may not traverse a host interface.

The method may further include generating the hash value based on a random salt value in addition to the key and the first user setting value, and generating the encrypted key by encrypting the hash value, the key and the random salt value using the fixed value.

A key manager according to some embodiments includes a key manager core including a controller. The key manager core is configured to receive a user setting value, a random number generator configured to generate a key, and a decrypted key memory configured to store the key and the user setting value, so that the user setting value is associated with the key. The key manager core is configured to generate a hash value based on the key and the user setting value, to generate an encrypted key by encrypting the hash value and the key using a fixed value, and to store the encrypted key in an encrypted key memory.

The random number generator is configured to provide the key to the key manager core without the key traversing a host interface.

The fixed value is unique to a system on chip that includes the key manager.

The key manager core is further configured to generate the hash value based on a random salt value in addition to the key and the user setting value, and to generate the encrypted key by encrypting the hash value, the key and the random salt value using the fixed value.

The user setting value may include a first user setting value, and the key manager core is configured to receive a second user setting value, to compare the second user setting value to the first user setting value, and to control use of the key in response to the comparison of the first user setting value and the second user setting value.

A system on chip according to further embodiments includes a central processing unit and a key manager coupled to the central processing unit. The key manager includes a key manager core including a controller and a user setting value register configured to store a user setting value received from the central processing unit, and a unique value storage coupled to the key manager core and configured to provide a unique value to the key manager core. The unique value may be unique to the system on chip. The key manager core is configured to generate a data encryption key based on the user setting value and the unique value in response to the key generation command.

The system on chip may further include a command register configured to store a key generation command received from the central processing unit and a user setting value register configured to store the user setting value. The key manager is configured to generate the data encryption key in response to the key generation command.

The key manager core may further include a cipher block, and the controller may be configured to provide the unique value and the user setting value to the cipher block. The cipher block is configured to generate the data encryption key by performing an operation on the unique value and the user setting value.

The user setting value includes a unique identifier of an application executed by the central processing unit and/or a unique data provided by a user of the application.

Some further embodiments provide a method of operating a key manager including a key manager core having a controller. The method includes receiving a user setting value at the key manager core from a host, receiving a unique value from a unique value storage. The unique value is unique to a system on chip that includes the key manager. The method further includes generating a data encryption key based on the user setting value and the unique value.

The method may further include receiving a command from the host; the data encryption key may be generated in response to the command.

The method may further include providing the unique value and the user setting value to a cipher block. The cipher block may generate the encrypted key by performing an encryption operation on the unique value and the user setting value.

A system on chip according to further embodiments includes a central processing unit and a key manager coupled to the central processing unit. The key manager includes a key manager core including a controller and a user setting value register configured to store a user setting value received from the central processing unit, a unique value storage coupled to the key manager core and configured to provide a unique value to the key manager core, a random number generator, and a key memory. The unique value is unique to the system on chip. The key manager core is configured to obtain a first data encryption key from the random number generator in response to a first key generation command, to store the first data encryption key and a user setting value associated with the first data encryption key in the key memory, to generate a hash value based on the first data encryption key and the user setting value, to generate an encrypted key by encrypting the hash value and the first data encryption key using the unique value, and to store the encrypted key in an encrypted key memory. The key manager core is further configured to generate a second data encryption key based on the user setting value and the unique value in response to a second key generation command.

One aspect of embodiments of the inventive concept is directed to provide a data processing system which comprises a memory; a central processing unit (CPU) configured to control the memory; and a key manager configured to manage a key under control of the CPU, the key manager including a first register configured to store a command received from the CPU; a second register configured to store a user setting value received from the CPU; a unique value storage configured to store a unique value; and a main controller configured to generate the key using the user setting value stored at the second register and the unique value in response to the command stored at the first register. The unique value is not output to an external device but used only in the key manager. The key manager generates the same keys using the same user setting values and generates different keys using different user setting values.

In exemplary embodiments, the main controller is configured to derive the key by performing a block cipher or a key hash using the unique value and the user setting value.

In exemplary embodiments, the data processing system further comprises a random number generator configured to output a random number. The main controller is configured to select the random number output from the random number generator as the key.

In exemplary embodiments, the data processing system further comprises a key memory. The main controller is configured to store the random number, which is selected as the key, at the key memory in association with the user setting value.

In exemplary embodiments, the main controller is configured to output a key corresponding to the user setting value from the key memory when the command stored at the first register is requesting a previously generated key and the user setting value is stored at the key memory.

In exemplary embodiments, the main controller is configured to read a key corresponding to the user setting value from the key memory and backup the read key when the command stored at the first register is requesting a backup of a previously generated key and the user setting value is stored at the key memory.

In exemplary embodiments, the data processing system further comprises a block cipher configured to encrypt the user setting value and the key read from the key memory. In response to the command requesting the backup, the encrypted data by the block cipher is backed up.

In exemplary embodiments, the data processing system further comprises a hash unit configured to generate a hash of the user setting value and the key read from the key memory. In response to the command requesting the backup, the hash is backed up with the key read from the key memory.

In exemplary embodiments, when the command stored at the first register requests a restoration, the hash unit generates a hash of the user setting value stored at the second register and the backed-up key. When the backed-up hash and the generated hash are the same, the backed-up key is restored.

In exemplary embodiments, the user setting value is set differently according to applications driven on the CPU.

In exemplary embodiments, the user setting value is generated based on identifier information of applications driven on the CPU.

In exemplary embodiments, the unique value storage comprises a one-time program circuit that stores and outputs the unique value.

In exemplary embodiments, the unique value storage comprises an electrical fuse that stores and outputs the unique value.

Another aspect of embodiments of the inventive concept is directed to provide an operating method of a key manager which manages a key for data encryption or decryption, the operating method comprising receiving a key request command and a user setting value; and outputting the key using a unique value and the user setting value according to the key request command, wherein the unique value is not output to an external device of the key manager but used only in the key manager, wherein the same keys are generated using the same user setting values, and different keys are generated using different user setting values.

In exemplary embodiments, outputting the key comprises outputting the key according to a first scheme when the key request command has a first type; and outputting the key according to a second scheme different from the first scheme when the key request command has a second type different from the first type, wherein in response to the same user setting values, a key according to the first scheme is different from a key according to the second scheme.

With embodiments of the inventive concepts, a key is generated using a user setting value and a unique value. The unique value and the key are not accessed by an application driven on a processor. Thus, it is possible to provide a processor including a key management circuit with improved security and an operating method of the key management circuit.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
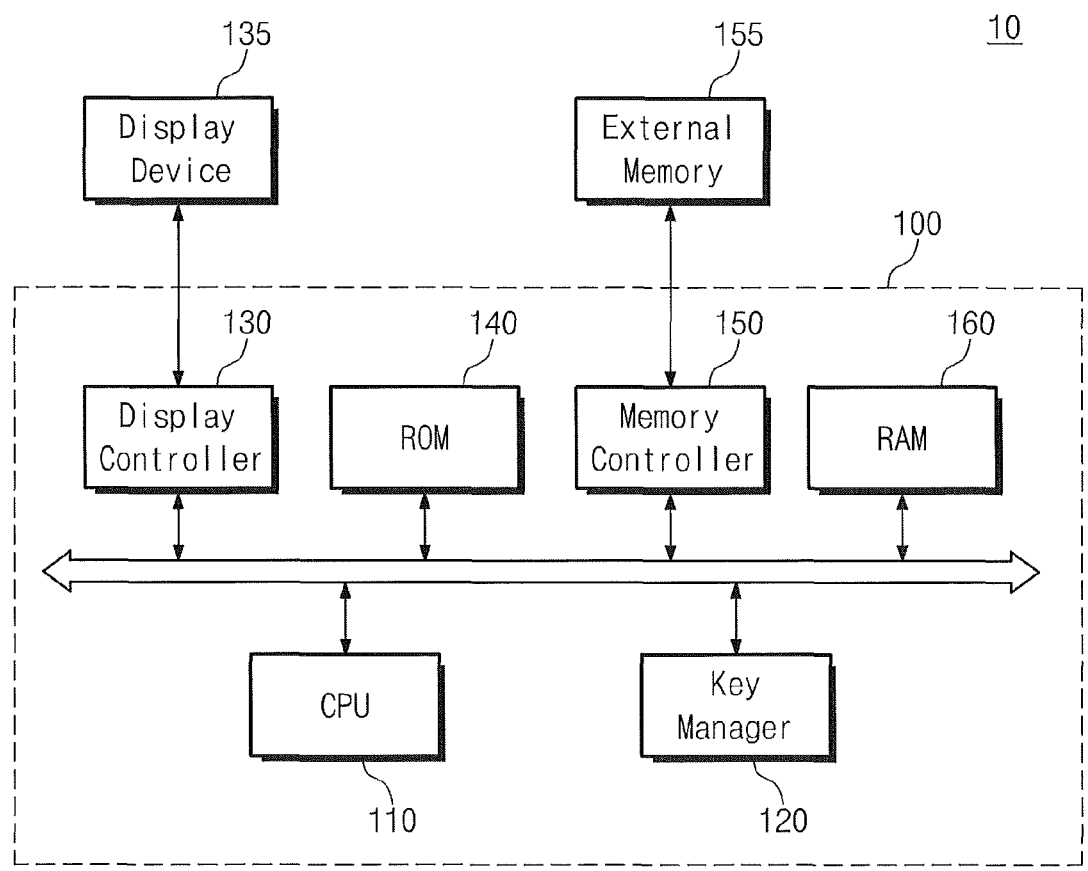
FIG. 1 is a functional block diagram of a data processing system 10 according to some example embodiments of the inventive concepts.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a functional block diagram of a data processing system 10 according to some example embodiments of the inventive concepts.

As illustrated in FIG. 1, the data processing system 10 may include a system on chip (SOC) 100, a display device 135, and an external memory 155. The data processing system 10 may be a mobile device, a smart phone, a personal digital assistant (PDA), a personal computer (PC), a tablet PC, a notebook, a net-book, an e-reader, a portable multimedia player (PMP), an MP3 player, or an MP4 player but is not restricted thereto.

The SOC 100 may be an application processor. The application processor may control the overall operation of the data processing system 10. The SOC 100 may include a central processing unit (CPU) 110, a key manager 120, a display controller 130, a read-only memory (ROM) 140, a random access memory (RAM) 160, a memory controller 150, and a bus. The SOC 100 may also include other elements, such as a power management unit, a television (TV) processor, a graphics processing unit (GPU), and a clock unit.

The CPU 110 may process or execute programs and/or data that are stored in the memory 140, 160, or 155 according to, for example, an operating clock frequency. The CPU 110 may be implemented as a multi-core processor. The multi-core processor is a single computing component with two or more independent actual processors (referred to as cores). Each of the processors may read and execute program instructions. The multi-core processor can drive a plurality of accelerators at a time, and therefore, a data processing system including the multi-core processor may perform multi-acceleration.

The key manager 120 manages keys used for encryption, and encrypts and decrypts data and the keys. Secure storage is a technique for permitting only authorized users or programs to access important data. For the secure storage, data is encrypted and securely stored in memory and then decrypted when it is used so that the data is protected from illegal users or programs. Decisions about illegal access depend on whether the access has permission to use a key for encryption.

The key manager 120 protects a key from attacks, such as key sniffing attacks and key corruption attacks. A key sniffing attack is an illegal access to a key, while a key corruption attack involves damaging or destroying a key. Accordingly, in order to securely manage a key, the key manager 120 blocks these illegal accesses to the key and can confirm the integrity of the key.

The key manager 120 provides a key management function. The key management function relates to management of the entire life cycle of a key including the creation, use, storage, decryption, and destruction of the key. The key management function may include encrypting and storing a key in non-volatile memory in preparation for possible power off and decrypting the key when necessary. It may also include key encryption, key hashing, and access control prohibiting a host (e.g., software or an application executed in the host) from accessing a key.

According to some example embodiments of the inventive concepts, a host can operate the key manager 120 only through a command, and software may not be permitted to access a key.

The programs and/or the data stored in the external memory 155 may be loaded to a memory or the CPU 110 within the SOC 100 when necessary.

The ROM 140 may store permanent programs and/or data. The ROM 140 may be implemented by an erasable programmable ROM (EPROM) and/or an electrically erasable programmable ROM (EEPROM).

The RAM 160 may temporarily store program instructions and/or data. The programs and/or data stored in the ROM 140 may be temporarily stored in the RAM 160 according to the control of the CPU 110 or a booting code stored in the ROM 140. The RAM 160 may be implemented by dynamic RAM (DRAM) or static RAM (SRAM).

The memory controller 150 is used for interface with the external memory 155. The memory controller 150 controls the overall operation of the external memory 155 and controls the data communication between a host and the external memory 155. The memory controller 150 may control the external memory 155 to write or read data at the request of the host. The host may be a master device such as the CPU 110 or the display controller 130.

The external memory 155 is a storage device for storing data and may store an operating system (OS) and various kinds of programs and data. The external memory 155 may be implemented by volatile memory such as DRAM or non-volatile memory such as flash memory, phase-change RAM (PRAM), magnetoresistive RAM (MRAM), resistive RAM (ReRAM), or ferroelectric RAM (FeRAM). In other embodiments, the external memory 155 may be embedded in the SOC 100.

The elements 110 through 160 may communicate with one another through the bus.

The display device 135 may display multimedia data. The display device 135 may be a liquid crystal display (LCD) device, but the inventive concepts are not restricted thereto. In other example embodiments, the display device 135 may be a light emitting diode (LED) display device, an organic LED (OLED) display device, or one of other types of display devices. The display controller 130 controls the operations of the display device 135.

Figure 2:
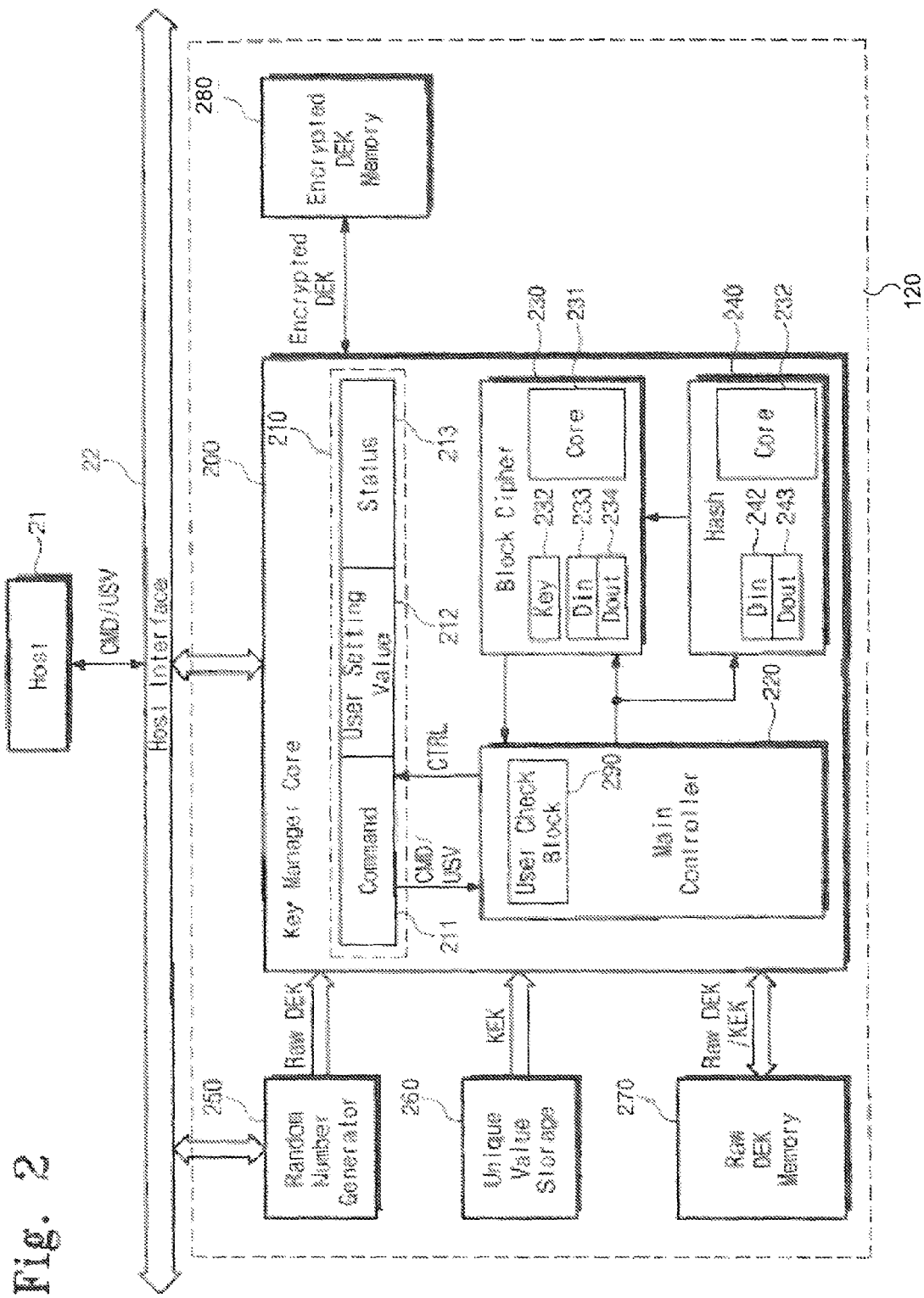
FIG. 2 is a block diagram schematically illustrating a key manager according to an embodiment of the inventive concepts.

FIG. 2 is a detailed block diagram of the key manager 120 illustrated in FIG. 1 in accordance with some embodiments.

Referring to FIGS. 1 and 2, the key manager 120 includes a key manager core 200, a random number generator 250, a unique value storage 260, a key memory 270, and an encrypted key memory 280.

The key manager core 200 supports block ciphers having various key sizes and provides a key generate function, key encrypt function, key decrypt function, key load function, and key destroy function in response to various commands received from the host 21. The key manager core 200 may be implemented in hardware.

The random number generator 250 may generate a pure random number or a pseudo random number. The random number generator may provide the generated random number DEK (or Data Encryption Key) to the key manager core 200. The random number generator 250 may also provide the generated random number DEK to an element of the data processing system 10 through the host bus 22. The random number generator 250 may exist within the key manager 200, but the inventive concepts are not limited thereto. The random number generator 250 may be implemented outside the key manager 200.

The unique value storage 260 may store a unique value KEK (or Key Encryption Key). The unique value KEK may be a unique value corresponding to the data processing system 10. Unique values of different data processing systems may be different from one another. In various embodiments, the unique value storage 260 may include a one-time program circuit, an electric fuse, a laser fuse, etc. that are configured to store the unique value KEK. The unique value storage 260 may include a nonvolatile memory that is configured to store the unique value KEK. The unique value storage 260 outputs the unique value KEK to the key manager core 200.

Software (e.g., an operating system, an application, etc.) running on the data processing system 10 may not be allowed to access the unique value storage 260. For example, the unique value storage 260 is a block to which an address accessed by the software is not allocated. In the event that an address is not allocated to the unique value storage 260, an access request (e.g., a read, write or erase request) of the software to the unique value storage 260 is ignored.

It is illustrated that the unique value storage is within the key manager 120, but the inventive concepts are not limited thereto. The unique value storage 260 may be provided outside the key manager 120.

The key memory 270 may store a key which is not encrypted, i.e., a raw key. The encrypted key memory 280 may store an encrypted key.

The key manager core 200 includes a register 210, a main controller 220, a block cipher unit 230, and a hash unit 240.

The register 210 includes a command register 211, a status register 212 and a user setting value register 213. The command register 211 stores a command received from a host 21. The status register 212 stores a result of executing the command of the host 21. Data of the status register 212 is reported to the host 21 using an interrupt or polling method. The user setting value register 213 stores a user setting value USV received from the host 21.

The command and the user setting value USV are issued by an operating system or an application driven by the host 21. The command may include a command for requesting a key, a command for requesting a backup of a key, and a command for requesting a restore of a key at the key manager 120. The command may include a command for requesting a key according to a first scheme and a command for requesting a key according to a second scheme different from the first scheme at the key manager 120.

The user setting value USV may be a value set by a user. The same user setting value corresponds to the same user, and different user setting values correspond to different users. For example, a user may be an application driven on the host 21. Applications driven on the host 21 use different user setting values. For example, identifiers ID of applications may be used as user setting values.

The user may correspond to an account on an operating system driven on the host 21. The same account may use the same user setting value, and different accounts may use different user setting values. A user setting value may include an account password, data generated from the account password, an account name, data generated from the account name, etc.

The user may be a terminal including the data processing system 10. The same terminal may use the same user setting value. The user setting value may be a locking password set by a user that utilizes the terminal.

In some instances, the user may be groups of software driven on the host 21. The same group may use the same user setting value, and different groups may use different user setting values. Software groups may use different user setting values. The software groups are classified according to a software category, a folder where software is placed, etc.

In some cases, the user may be a person. The same person may use the same user setting value.

The main controller 220 interprets and executes the command from the host 21. The main controller 220 may be implemented by a finite state machine (FSM).

The main controller may operate in response to the command stored in the command register 211. The main controller may operate using the user setting value USV stored in the user setting value register 213. The main controller 220 may store a result of an execution of the command at the status register 212. For example, the result of the execution may be stored at the status register 212 as control signal CTRL.

The main controller 220 may receive the random number DEK from the random number generator 250, and may receive the unique value KEK from the unique value storage 260. Based on the user setting value USV, the random number DEK and the unique value KEK, the main controller 220 may generate a key.

For example, according to a first scheme, the main controller 220 may derive the key from the user setting value USV and the unique value KEK using a block cipher or a key hash. The main controller 220 derives the key from the user setting value USV and the unique value KEK using one of a number of derivation methods by which an output value is derived or analogized from an input value.

According to a second scheme, the main controller 220 may select the random number DEK from the random number generator 250 as the key. The main controller 220 may manage the random number DEK selected as the key in association with the user setting value USV. The main controller 220 may store the associated key and user setting value in the key memory 270. The main controller may transfer the associated key and user setting value USV to the block cipher processor 230 and the hash processor 240.

The main controller 220 includes a user check block 290. The user check block 290 may determine whether the user setting value USV received from the user setting value register 213 matches one of user setting values stored at the key memory 270. When the user check block 290 checks a user, for example checks validity or authentication of the user, the main controller 220 may perform post processes according to a result of the user check.

For example, if the command stored at the command register 211 requests a key of a first type, the main controller 220 may derive the key according to the unique value KEK from the unique value storage 260 and the user setting value USV from the use setting value register. For example, when the key of the first type is needed, the host 21 may transfer a commend requesting the key of the first type and the user setting value USV to the register 210.

If the command received from the command register 211 requests generation of a key of a second type, the main controller 220 may select the random number DEK as the key, and store the key in association with the user setting value USV. That is, when the key of the second type is needed, the host 21 may transfer a command requesting the key of the second type and the user setting value USV to the register 210.

If the command received from the command register 211 requests loading of a previously generated key of the second type, the user check block 290 may check whether the user setting value USV corresponds to (e.g., identical to) one of user setting values stored at the key memory 270. If the corresponding one exists, the main controller 220 may select a key (i.e., a random number DEK) stored at the key memory 270 in association with the corresponding one. That is, when the key of the second type is needed, the host 21 may transfer a command requesting the key of the second type and the user setting value USV to the register 210.

If the command received from the command register 211 requests a backup of a key of a second type, the user check block 290 may check whether the user setting value USV corresponds to (e.g., identical to) one of user setting values stored at the key memory 270. If the corresponding one exists, the main controller 220 may transfer the corresponding user setting value USV and an associated key with the corresponding user setting value USV to the block cipher processor 230 and the hash processor 240. An encrypted key through the block cipher processor 230 and the hash processor 240 may be stored at the encrypted key memory 280. That is, when a backup of the key of the second type is needed, the host 21 may transfer a command requesting the key of the second type and the user setting value USV to the register 210.

The block cipher unit 230 may encrypt or decrypt (or restore) data and a key according to control of the main controller 220. For example, the block cipher processor 230 may receive the key and the user setting value USV from the main controller 220. The block cipher processor 230 may receive a hash from the hash processor 240. The block cipher processor 230 may encrypt the key, the user setting value and the hash using a fixed value. The encrypted data may be stored in the encrypted key memory 280. Furthermore, the block cipher processor 230 may read the encrypted data from the encrypted key memory 280, and then decrypt the encrypted data using the fixed value. The block cipher processor 230 may restore the key, the user setting value USV and the hash through the decryption. For example, the fixed value may include the unique value KEK from the unique value storage 260.

The block cipher unit 230 may include a core logic 231, a key register 232, an input data register 233, and an output data register 234.

The core logic 231 performs encryption and decryption. The key register 232 temporarily stores a key for encryption or decryption of a key, i.e., a KEK or a key for encryption or decryption of data, i.e., a DEK. The input data register 233 temporarily stores a key or data to be encrypted or decrypted. The output data register 234 temporarily stores an encrypted or decrypted key or data.

The hash unit 240 hashes a key and a user setting value USV according to control of the main controller 220. A hash algorithm of the hash unit 240 is a function that converts an input value with a random length into an output value with fixed length. The output value is referred to as a hash value. The hash processor 240 may include a core 232 generating the hash, an input data register 242 temporarily storing input data and an output data register temporarily storing output data (i.e., the hash).

The key manager 120 interfaces with the host 21 through a host interface 22. The host interface 22 transfers commands, status, and keys between the host 21 and the key manager 120. The host interface 22 may include an advanced microcontroller bus architecture (AMBA) high-performance bus (AHB) slave interface, but example the inventive concepts are not restricted thereto.

Figure 3:
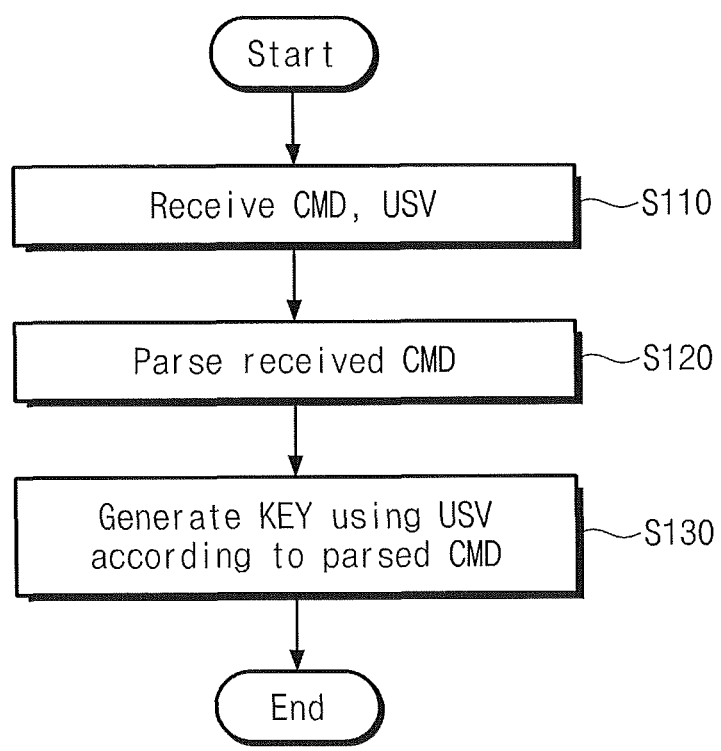
FIG. 3 is a flow chart showing an operating method of a key manager according to an embodiment of the inventive concepts.

FIG. 3 is a flow chart showing an operating method of a key manager 120 according to an embodiment of the inventive concepts. Referring to FIGS. 2 and 3, in step S110, a key manager 120 receives a command CMD and a user setting value USV from a host 21. For example, the key manager 120 receives the command CMD and the user setting value USV that are issued from an operating system or an application driven on the host 21.

In step S120, the key manager 120 parses the command CMD. For example, the memory controller 220 may parse the command stored at a command register 211.

In step S130, the key manager 120 generates a key KEY using a user setting value USV according to a parsing result of the command CMD. For example, the main controller 220 may derive the key KEY from the user setting value USV and a unique value KEK from the unique value storage 260 according to a first scheme. The main controller 220 may select a random number DEK from a random number generator 250 as the key KEY. The main controller 220 may select the key KEY corresponding to the user setting value USV from the key memory 270.

In exemplary embodiments, the key KEY is output based on certification of the user setting value USV. In the event that the user setting value USV is not a correct value, the main controller 220 may generate an incorrect key. In the event that the user setting value USV is not a correct value, the main controller 220 may select an incorrect key from the key memory 270. When the correct key is not selected, a decryption or an encryption cannot be performed successfully. Thus, an illegal access for encrypted data may be prevented.

According to some embodiments of the inventive concepts, in the event that certification performed using a user setting value USV is successful, encryption and decryption of data are performed using a key that is not accessed by software. The key is generated using the unique value DEK that is not accessed by software or a key that is generated using a random number KEK. Thus, since an attempt to acquire a key or data in an inappropriate method (e.g., hacking), security of the key manager 120 and the data processing system 10 including the key manager 120 may be improved.

Figure 4:
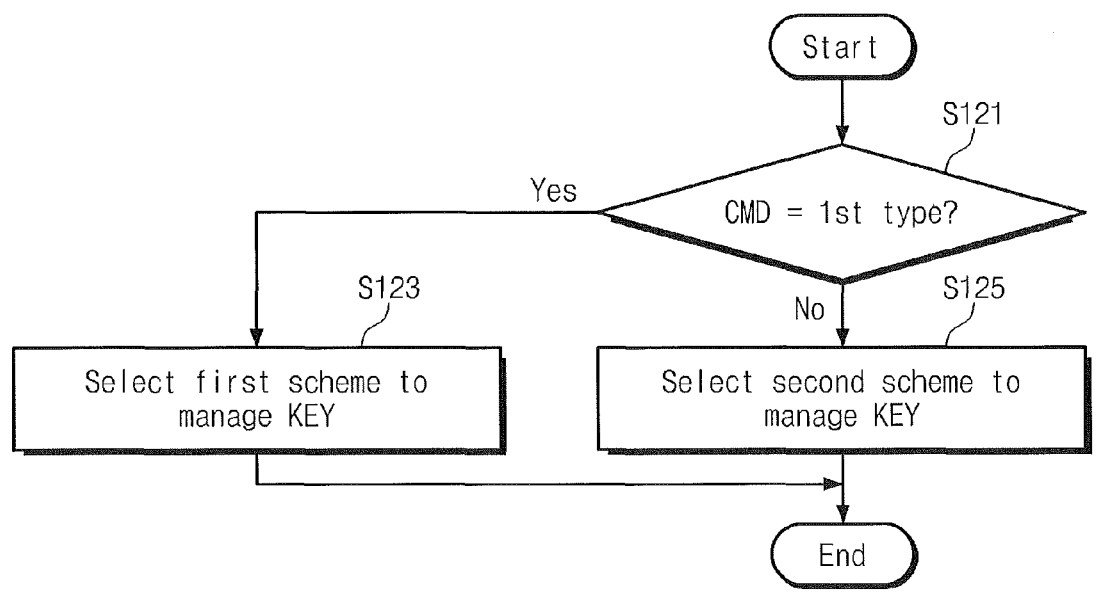
FIG. 4 is a detailed flow chart of step 210 of parsing a command according to an embodiment of the inventive concepts.

FIG. 4 is a detailed flow chart of step S120 of parsing a first command CMD, according to an embodiment of the inventive concepts. Referring to FIGS. 2 to 4, in step S121, whether a command CMD has a first type is determined. For example, a main controller 220 determines whether the command CMD received from a command register 211 has a first type.

If the command CMD has the first type, in step S123, a first scheme for managing a key KEY is selected. For example, the main controller 220 may select a first scheme in which a key KEY is generated using a unique value KEK and a user setting value USV.

If the command CMD does not have the first type, in step S125, a second scheme for managing a key KEY is selected. For example, the main controller 220 may selects a second scheme in which a random number DEK from a random number generator 250 or stored at the key memory 270 is selected as the key KEY.

Figure 5:
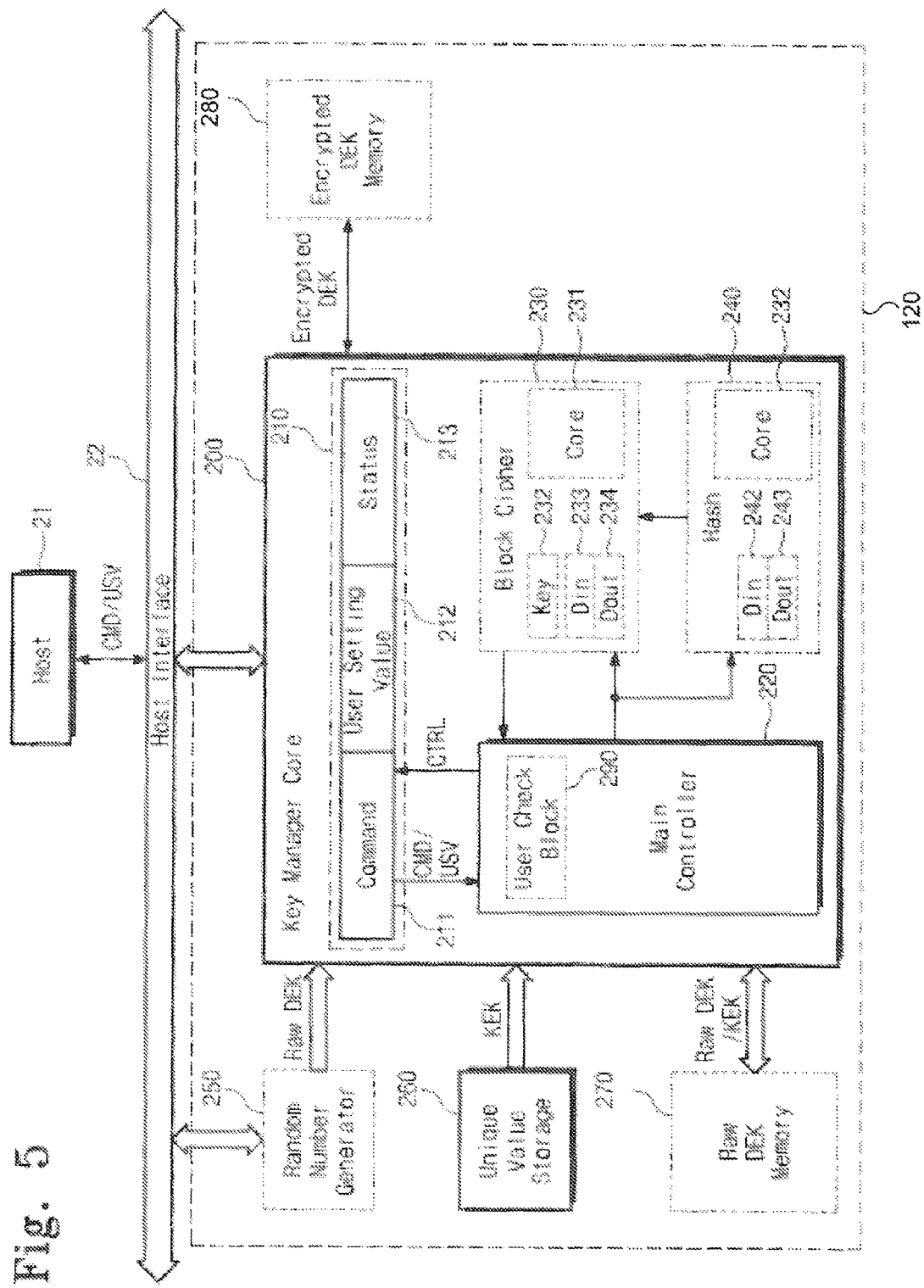
FIG. 5 is a diagram for describing an operation of a key manager when a first scheme is selected.

FIG. 5 is a diagram for describing an operation of a key manager 120 when a first scheme is selected. In FIG. 5, blocks that are not used when the first scheme is selected are shown in a dotted line as compared with a key manager 120 shown in FIG. 2. Referring to FIG. 5, when the first scheme is selected, a block cipher processor 230, a hash processor 240, a random number generator 250, a key memory 270, a encrypted key memory 280 and a user check block 290 are not used.

Figure 6:
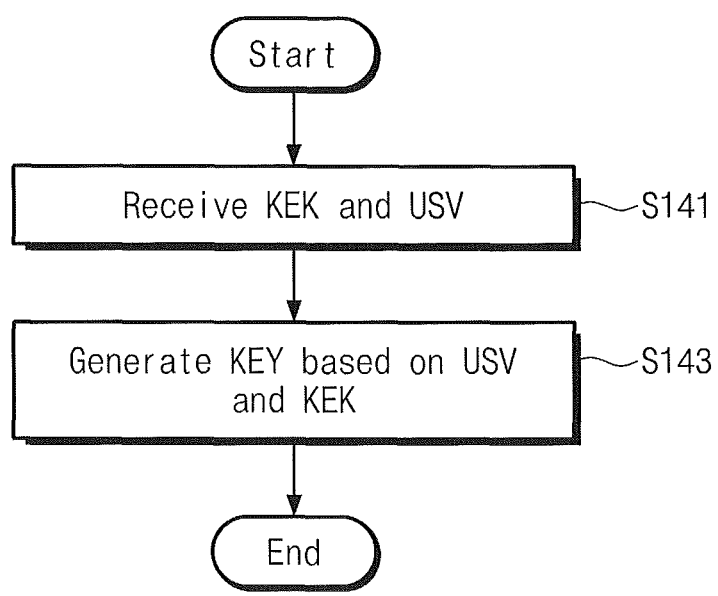
FIG. 6 is a flow chart schematically illustrating a first scheme according to an embodiment of the inventive concepts.

FIG. 6 is a flow chart schematically illustrating a first scheme according to an embodiment of the inventive concepts. Exemplarily, in FIG. 6, there is illustrated an operation of generating a key using a first scheme. For example, a command CMD received from a host 21 may be a first type of command.

Referring to FIGS. 5 and 6, in step S141, a unique value KEK is read. For example, the main controller 220 reads the unique value KEK from a unique value storage 260. In some cases, the main controller 220 may read a part of a unique value stored in the unique value storage 260 as the unique value KEK.

In step S143, the key KEY is generated using the user setting value USV and the unique value KEK. For example, the main controller 220 may generate the key KEY by applying a predetermined algorithm to the user setting value USV and the unique value KEK. The main controller 220 may derive the key KEY from the user setting value USV and the unique value KEK using a block cipher or a key hash. The main controller 220 may derive the key KEY from the user setting value USV and the unique value KEK using one of derivation methods by which an output value is derived or analogized from an input value. The main controller 220 generates the key KEY using an algorithm where the same output is generated with respect to the same input.

In an embodiment, the generated key KEY may be output to a host 21 or an encryption processor (not shown). At the host 21 or the encryption processor, the key KEY may be used to encrypt data.

As described above, in the first scheme, a key KEY is generated whenever the key KEY is needed. The unique value storage 260 outputs a unique value KEK always having the same value. Thus, whenever the user setting value USV having the same first value is received, the key KEY always having the same first value is output. If the user setting value USV having a second value different from the first value is received, the key KEY having a second value different from the first value is output. Thus, since the key KEY is appropriately generated only with respect to a proper user, it is possible to provide a key manager 120 having improved security based on user certification, a data processing system 10 including the key manager 120, and a data management method. Also, the unique value KEK is not accessible by software driven on the host 21. Thus, it is possible to provide a key manager 120 having improved security, the data processing system 10 including the key manager 120, and the data management method.

Figure 7:
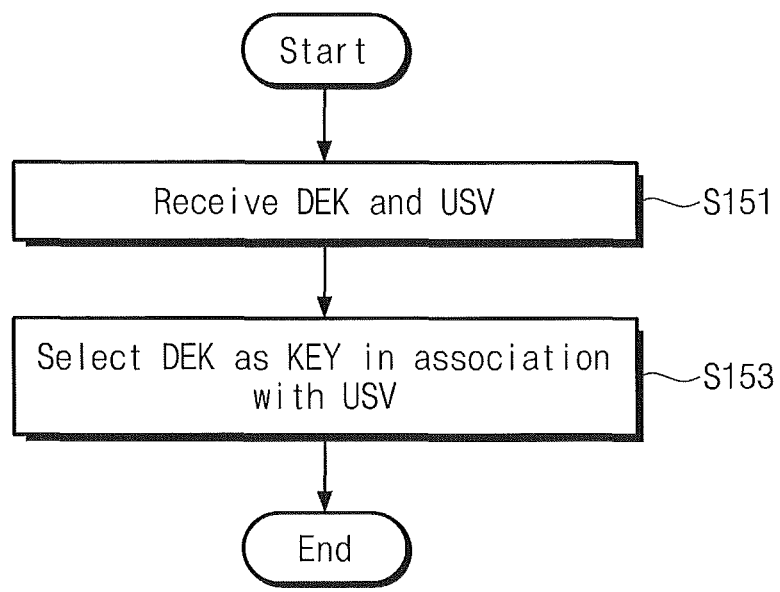
FIG. 7 is a flow chart schematically illustrating a second scheme according to an embodiment of the inventive concepts.

FIG. 7 is a flow chart schematically illustrating a second scheme according to an embodiment of the inventive concepts. For example, a command CMD received from a host 21 may be a second type of command, and may be a command requesting generation of a key KEY.

Referring to FIGS. 2 and 7, in step S151, a random number DEK and a user setting value USV are received. A main controller 220 receives the random number DEK from the random number generator 250 and receives the user setting value USV from the user setting value register 213.

In step S153, the random number DEK is selected as the key KEY in association with the user setting value USV. For example, the random number DEK may be selected as the key KEY corresponding to the user setting value USV. The random number DEK selected as the key KEY is stored at the key memory 270 with the associated user setting value USV.

In an embodiment, the user setting value USV and the random number DEK selected as the key KEY may be transferred to the hash processor 240. The hash processor 240 generates a hash based on the user setting value USV and the key KEY. The generated hash may be transferred to the block cipher processor 230.

In some embodiments, a salt may be concatenated to the random number DEK and the user setting value USV, and the resulting number may be processed by the hash processor 240 to generate the hash.

A "salt" is random data that is used as an additional input to a one-way hash function. The use of a salt may help to defend against certain types of attacks. A new salt may be randomly generated for each key that is generated. In some embodiments, the salt may be concatenated with the key and the USV, and the resulting number is processed with a cryptographic hash function in the hash 240 as follows:

$$\text{Hash} = H(\text{DEK} + \text{salt} + \text{USV}) \quad [1]$$

where H( ) is a cryptographic hash function and the '+' operator refers to concatenation.

The user setting value USV, the salt, and the random number DEK selected as the key KEY may be transferred to the hash processor 240, which applies the hash function HQ to generate the hash.

The block cipher processor 230 may receive the hash, the random number DEK and the salt from the hash processor 240. The block cipher processor 230 may encrypt the random number DEK selected as the key KEY, the salt and the hash using a fixed value. The fixed value may be a unique value KEK from the unique value storage 260. That is, the block cipher processor 230 may perform the following operation to generate the encrypted DEK:

$$\text{Encrypted DEK} = E_{KEK}(\text{hash}, \text{DEK}, \text{salt}) \quad [2]$$

where $E_{KEK}$( ) refers to encryption using the unique value KEK as the encryption key.

The encrypted data may be stored at the encrypted key memory 280. That is, the key KEY is encrypted and then backed up. For example, the backup of the key may be performed flowing a generation of the key KEY or in response to a request from the host 21.

In another embodiment, a user check block 290 may perform a user check using the user setting value USV. That is, the user check block 290 may check whether the user setting value USV is stored at the key memory 270. In a case in which the user setting value USV is not stored at the key memory 270, the main controller selects the random number DEK from the random number generator 250 as the key KEY. In a case in which the user setting value USV is stored at the key memory, the main controller 220 may notify the host 21 that the key KEY corresponding to the user setting value USV is already generated. In another embodiment, in a case in which the user setting value USV is stored in the key memory 270, the main controller 220 may select the random number DEK corresponding to the user setting value USV and stored at the key memory 270 as the key KEY.

In an embodiment, the generated key KEY may be output to a host 21 or a block cipher processor 230. At the host 21 or the block cipher processor 230, the key KEY may be used to encrypt data.

Figure 8:
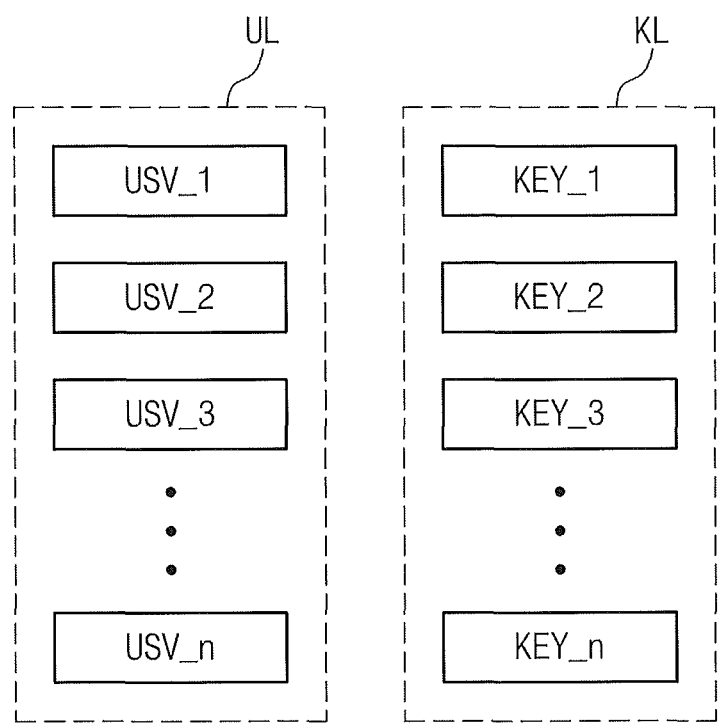
FIG. 8 is a block diagram schematically illustrating a key memory according to an embodiment of the inventive concepts.

FIG. 8 is a block diagram schematically illustrating a key memory 270 according to an embodiment of the inventive concepts. Referring to FIG. 8, a key memory 270 stores a user setting value list UL and a key list KL. The user setting value list UL includes a plurality of user setting values USV_1 to USV_n. The key list KL includes a plurality of keys KEY_1 to KEY_n. The user setting values USV_1 to USV_n correspond to the keys KEY_1 to KEY_n, respectively. For example, when a user setting value USV_k and a key KEY_k are registered in the user setting value list UL and the key list KL, respectively, there is generated and stored information indicating that the user setting value USV_k and the key KEY_k are correlated. Alternatively, the user setting value USV_k and the key KEY_k with which it is correlated may be stored at a location (a predetermined address) predetermined according to a predetermined rule.

Figure 9:
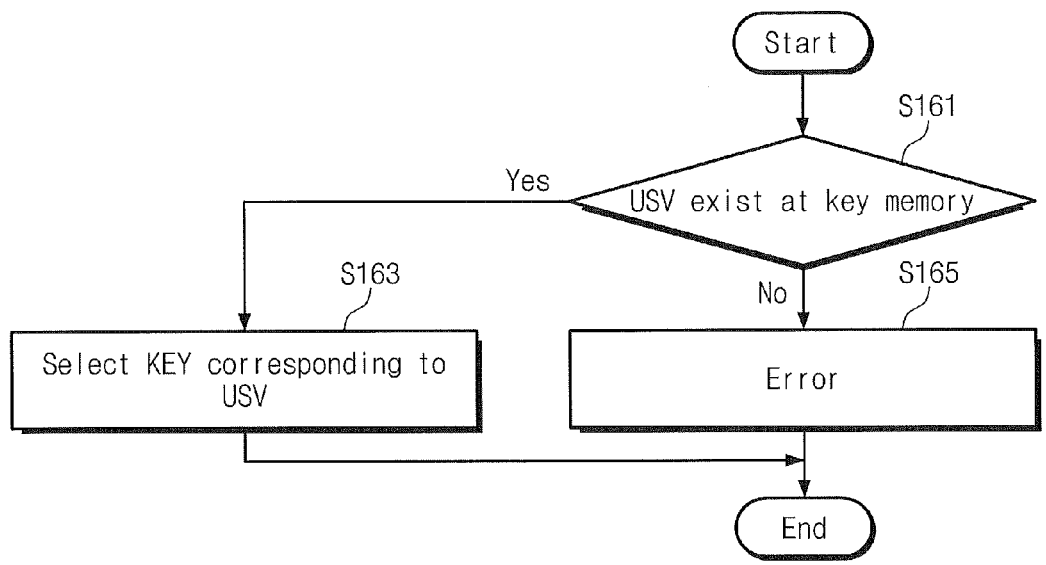
FIG. 9 is a flow chart schematically illustrating a second scheme according to another embodiment of the inventive concepts.

FIG. 9 is a flow chart schematically illustrating a second scheme according to another embodiment of the inventive concepts. In FIG. 9, there is illustrated an operation of selecting or loading a key previously generated using a second scheme. For example, a command CMD received from a host 21 has a second type and is a command requesting a key KEY.

Referring to FIGS. 2 and 9, in step S161, it is determined whether the user setting value USV exists in the key memory 270. For example, the user check block 290 determines whether the user setting value USV received from the user setting value register 213 is stored in the key memory 270.

As a consequence of determining that the user setting value USV exists in the key memory 270, in step S163, a key KEY corresponding to the user setting value USV is read from the key memory 270. As a consequence of determining that the user setting value USV does not exist in the key, memory 270, the user check block 290 or the main controller 220 determines that an error occurs. The main control block 220 informs a host 21 that the key KEY corresponding to the user setting value USV is not generated.

In another embodiment, when the user setting value USV does not exist at the key memory 270, the main controller may generate a key KEY as described referring to FIG. 7.

In an embodiment, the read key KEY may be output to a host 21 or a block cipher processor 230. At the host 21 or the block cipher processor 230, the key KEY may be used to encrypt data.

Figure 10:
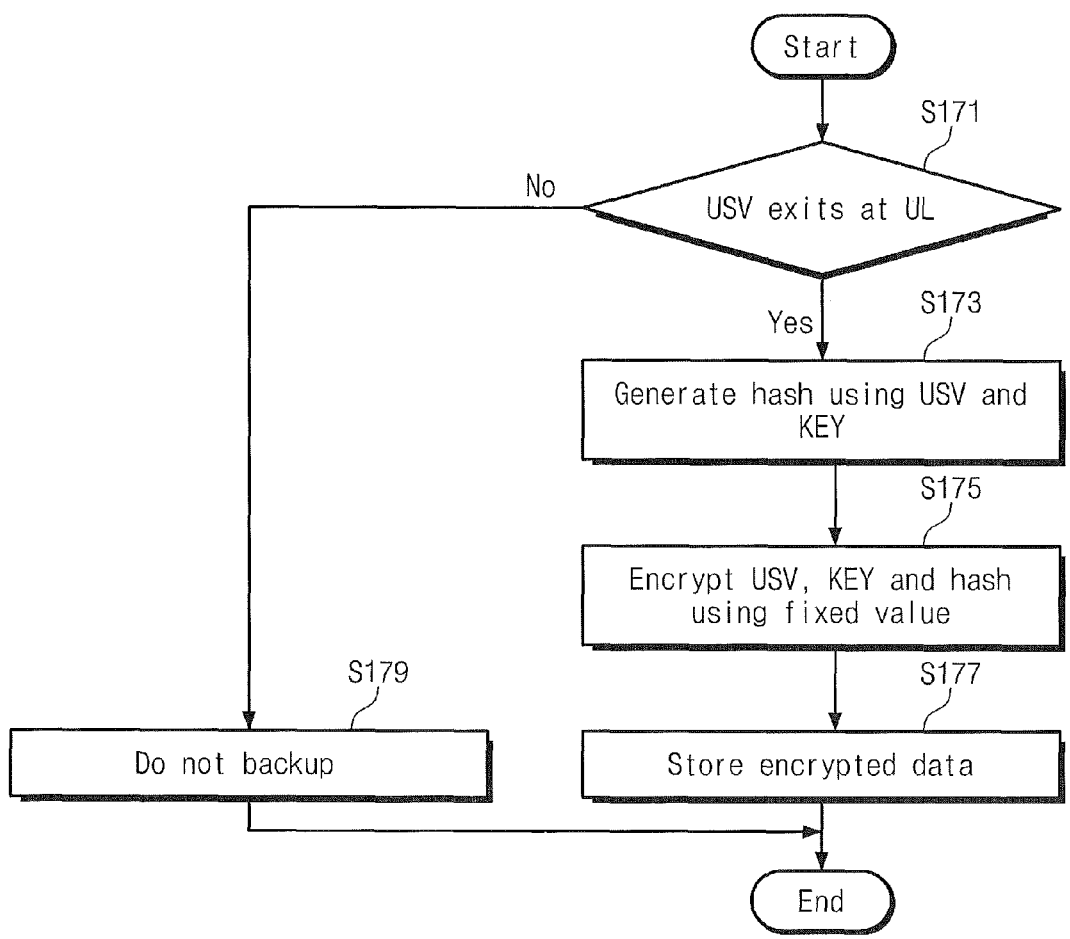
FIG. 10 is a flow chart schematically illustrating a second scheme according to still another embodiment of the inventive concepts.

FIG. 10 is a flow chart schematically illustrating a second scheme according to still another embodiment of the inventive concepts. In FIG. 10, there is illustrated an operation of backing up a key using a second scheme. For example, a command CMD received from a host 21 has a second type and is a command requesting a backup of a key KEY.

Referring to FIGS. 2 and 10, in step S171, whether a user setting value USV exists in a key memory 270 is determined.

As a consequence of determining that the user setting value USV is not stored in the key memory 270, in step S179, a procedure is ended without a backup operation. The main controller 220 informs the host 21 that the key KEY corresponding to the user setting value USV is not generated.

As a consequence of determining that the user setting value USV is stored in the key memory 270, in step S173, a hash is generated using the user setting value USV and the key KEY. For example, the main controller 220 sends the key KEY and the user setting value USV to a hash processor 240. The hash processor 240 generates a hash using the key KEY and the user setting value USV.

In step S175, the user setting value USV, the key KEY, and the hash are encrypted using a fixed value. For example, the main controller 220 may transfer the user setting value USV and the key KEY to the block cipher processor 230. The hash processor 240 may transfer the hash to the block cipher processor 230. The block cipher processor 230 may encrypt the user setting value USV, the key KEY, and the hash using the fixed value. The fixed value may be a value internally generated at the block cipher processor 230 or the unique value KEK from the unique value storage 260.

In step S177, the encrypted data are stored. For example, the encrypted data may be stored at the encrypted key memory 280. In another example, the encrypted data may be stored at a nonvolatile memory connected to a host interface 22 through the host interface 22. That is, the encrypted data may be backed up internally at the key manager 120 or externally at a nonvolatile memory outside the key manager 120.

Figure 11:
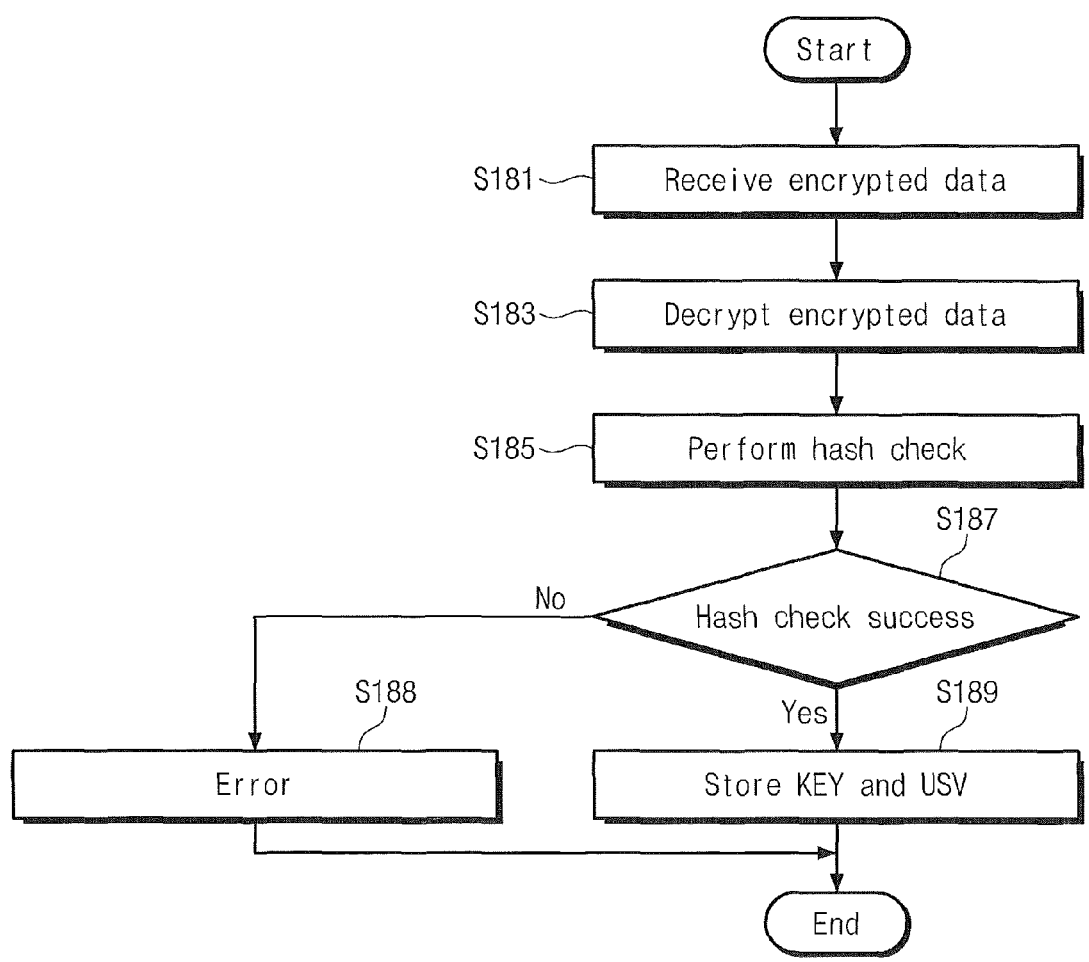
FIG. 11 is a flow chart schematically illustrating a second scheme according to a further embodiment of the inventive concepts.

FIG. 11 is a flow chart schematically illustrating a second scheme according to a further embodiment of the inventive concepts. In FIG. 11, there is illustrated an operation of restoring a backed-up key using a second scheme. For example, a command CMD received from a host 21 has a second type and is a command of requesting a restoration of a key KEY.

Referring to FIGS. 2 and 11, in step S181, encrypted data are received. For example, the encrypted data may be read from a storage where the encrypted data are backed-up. The encrypted data may be read from an encrypted key memory 280 or a nonvolatile memory connected to the host interface 22.

In step S183, the encrypted data are decrypted. The block cipher processor 230 may receive the encrypted data and then decrypt the encrypted data using a fixed value. The fixed value may be a unique value KEK obtained from the unique value storage 260.

In step S185, a hash check operation is performed. For example, the main controller 220 may transfer a user setting value USV from a user setting value register 213 and a key KEY decrypted from the encrypted data by the block cipher processor 230 to the hash processor 240. The hash processor 240 may generate a hash from the user setting value USV from the user setting value register 213 and the key KEY decrypted from the encrypted data. The main controller 220 may compare the hash generated by the hash processor 240 with the hash decrypted from the encrypted data.

In step S187, it is determined whether the hash check operation successes. When the compared two hashes are identical each other, the main controller 220 determines that the hash check operation successes. When the compared two hashes are different each other, the main controller 220 determines that the hash check operation fails.

If the hash check operation is determined to be successful, in step S189, the key KEY and the user setting value USV are stored in a key memory 270. If the hash check operation is determined to be failed, in step S188, it is determined that an error occurs. The key KEY is not restored, and the main controller (220) informs the host 21 that a restore operation is failed.

When a user setting value USV received with a command requesting a restoration of a key KEY is identical to a user setting value USV used in a decryption of a key KEY, the two hashes will be the same. Furthermore, when there are no errors on a key KEY decrypted from an encrypted data, the compared two hashes will be the same. That is, when a correct user setting value USV having an authority is input and there are no errors on the key KEY decrypted from the encrypted data, the key KEY is restored from a backup storage and then stored at the key memory 270. When an incorrect user setting value USV having no authority is input or there are errors on the key KEY decrypted from the encrypted data, the key KEY is not restored.

As described above, in the second scheme, a key KEY is output only when a proper user setting value USV is received from the host 21. Thus, it is possible to provide a key manager 220 having improved security, a data processing system 10 including the key manager 220, and a data management method.

Figure 12:
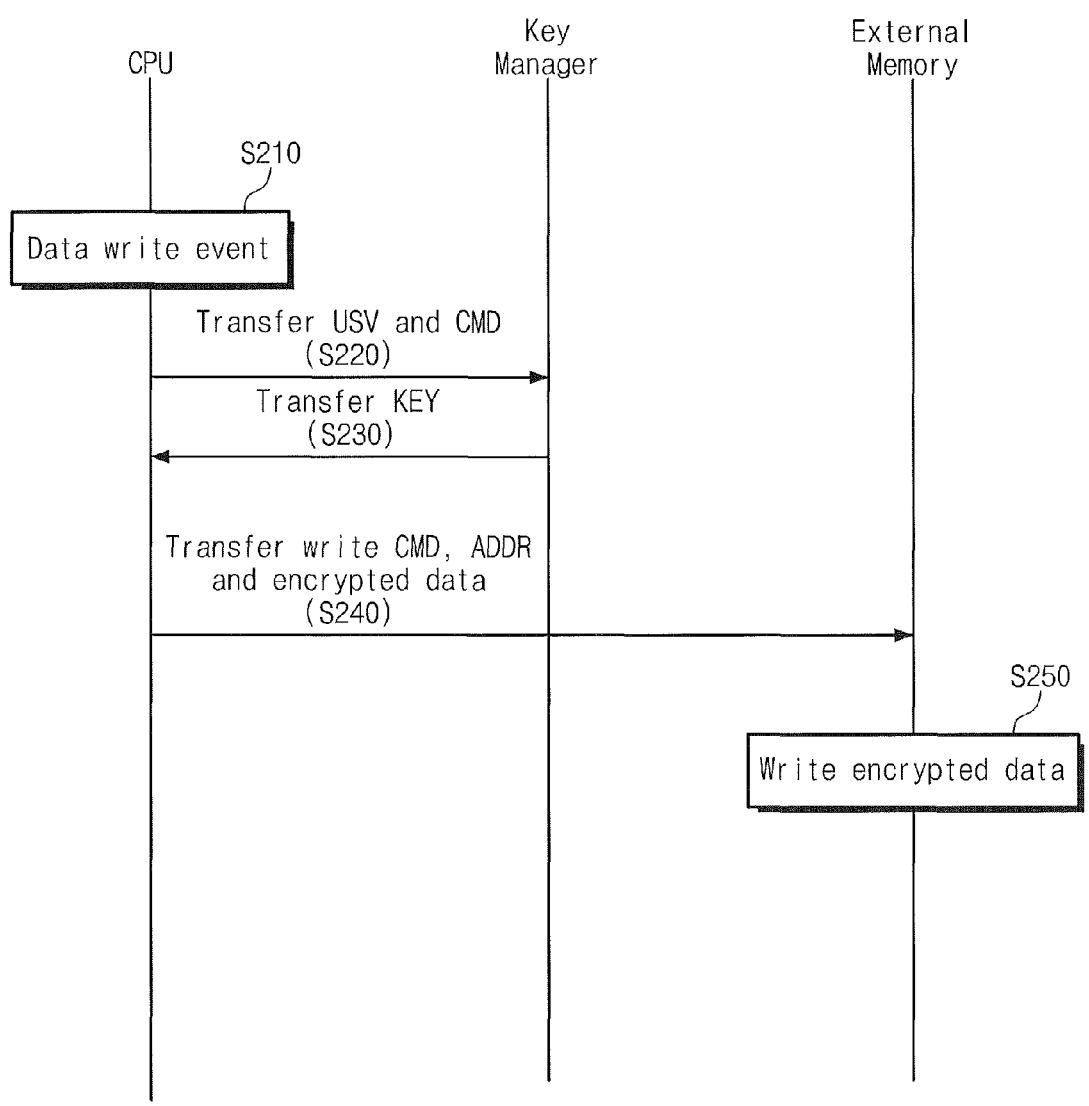
FIG. 12 is a flow chart schematically illustrating an operating data processing system shown in FIG. 1, according to an embodiment of the inventive concepts.

FIG. 12 is a flow chart schematically illustrating an operating method of a data processing system 10 shown in FIG. 1, according to an embodiment of the inventive concepts. In FIG. 12, there is exemplarily illustrated a method where a data processing system 10 writes data to an external memory 155.

Referring to FIGS. 1 and 12, in step S210, a data write event is issued. A write event means such a situation that writing of data at the external memory 155 is requested. For example, a write event is issued by software (e.g., an operating system, an application, etc.) driven on a CPU 110 of the data processing system 10.

If the write event issued, in step S220, the CPU 110 sends a user setting value USV and a command CMD to a key manager 120. The command CMD may be a command requesting a key KEY. For example, the command CMD may be a command requesting generation of a key according to a first scheme or a command requesting generation or loading of a key according to a second scheme. The user setting value may be an identifier of the operating system or the application which requests writing of data.

In step S230, the key manager 120 outputs the key KEY. For example, based on a user setting value USV, the key manager 120 generates a key KEY according to a first scheme or generates or loads a key KEY according to a second scheme. In step S230, it is assumed that the key KEY is normally output without any error described above. In an embodiment, the key manager 120 may output the key KEY to an element which is configured to encrypt data to be written into the external memory 155. In a case that the CPU 110 is configured to encrypt the data, the key manager 120 may output the key KEY to the CPU 110. In a case that the key manager 120 is further configured to encrypt the data, that is, in a case that the block cipher processor 230 of the key manager 120 is further configured to encrypt the data, the key manager 120 may not output the key KEY to exterior and use it internally. In a case that there are a separate circuit or logic configured to encrypt data to be written into the external memory 155, the key manager 120 may output the key KEY to the separate circuit or logic. In the embodiment shown at FIG. 12, it is assumed that the key manager 120 output the key KEY to the CPU 155, however inventive concepts of the present invention are not limited thereto.

In step S240, the CPU 110 sends a write command an address and an encrypted data to the external memory 155. For example, the CPU 110 may encrypt data to be written into the external memory 155 using the key KEY. The CPU 110 may transfer the encrypted data to the external memory 155 with the write command and the address. In another embodiment, in a case that an encryption of the data to be written into the external memory 155 is performed by the separate circuit or logic, the encrypted data may be transferred to the external memory 155 from the separate logic or circuit to the CPU 110. In another case that the encryption of the data to be written into the external memory 155 is performed by the key manager 120, the encrypted data may be transferred to the external memory 155 from the key manager 120 not the CPU 110.

In step S250, the encrypted data is written to the external memory 300.

As described with reference to FIG. 12, data written at the external memory 155 is encrypted using a key KEY. The key KEY may be generated through user certification based on the user setting value USV. Thus, security of data stored in the external memory 155 is improved.

Figure 13:
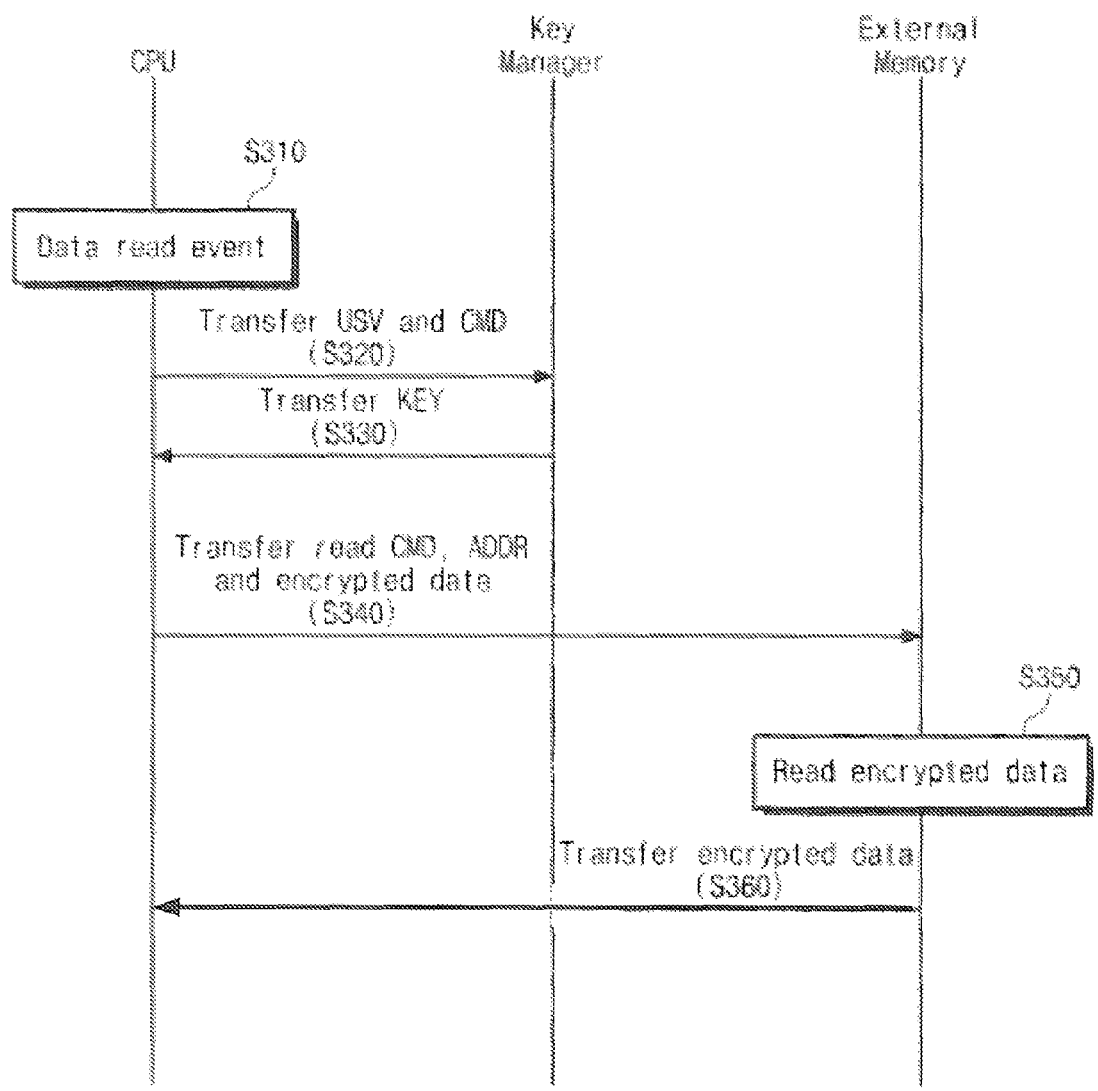
FIG. 13 is a flow chart schematically illustrating an operating method of a data processing system shown in FIG. 1, according to another embodiment of the inventive concepts.

FIG. 13 is a flow chart schematically illustrating an operating method of a data processing system 10 shown in FIG. 1, according to another embodiment of the inventive concepts. In FIG. 13, there is illustrated a method where the data processing system 10 reads data from an external memory 155.

Referring to FIGS. 1 and 13, in step S310, a data read event is issued. In a data read event, a request is made for data to be read from an external storage 155. For example, the data read event is issued by software (e.g., an operating system, an application, etc.) driven on a CPU 110 of a data processing 10.

In step S320, the CPU 110 sends a user setting value USV and a command CMD to a key manager 120. The command CMD may be a command requesting a key KEY.

In step S330, the key manager 120 outputs the key KEY to the CPU 110. For example, based on a user setting value USV, the key manager 120 generates a key KEY according to a first scheme or generates or loads a key KEY according to a second scheme.

In step S330, it is assumed that the key KEY is normally output without any error described above. In an embodiment, the key manager 120 may output the key KEY to an element which is configured to decrypt data read from the external memory 155. In a case that the CPU 110 is configured to decrypt the data, the key manager 120 may output the key KEY to the CPU 110. In a case that the key manager 120 is further configured to decrypt the data, that is, in a case that the block cipher processor 230 of the key manager 120 is further configured to decrypt the data, the key manager 120 may not output the key KEY to exterior and use it internally. In a case that there is a separate circuit or logic configured to decrypt data read from the external memory 155, the key manager 120 may output the key KEY to the separate circuit or logic. In the embodiment shown at FIG. 13, it is assumed that the key manager 120 outputs the key KEY to the CPU 155, however the inventive concepts of the present invention are not limited thereto.

In step S340, the CPU 110 sends a read command and an address to the external memory 155.

In step S350, the external memory 155 reads encrypted data stored at a location corresponding to the address received in step S340, in response to the read command received in step S340.

In step S360, the external memory 155 sends the read data, that is, the encrypted data to a CPU 110. As described above, the external memory 155 may send the encrypted data to an element which is configured to decrypt the encrypted data. The external memory 155 may sends the encrypted data to an element where the key KEY is transferred. In a case that the CPU 110 performs a decryption, the external memory 155 may send the encrypted data to the CPU 110.

Exemplarily, steps S320 and S330 are sequentially performed. Steps S340 to S360 are sequentially performed. Each of steps S320 and S340 is performed in parallel with each of steps S340 to S360 or before or after each of steps S340 to S360. Each of steps S340 to S360 is performed in parallel with each of steps S320 and S340 or before or after each of steps S320 and S330.

As described with reference to FIG. 13, data read from the external memory 155 is decrypted using a key KEY. The key KEY may be output through user certification based on the user setting value USV. Thus, security of data stored in the external memory 155 is improved.

Figure 14:
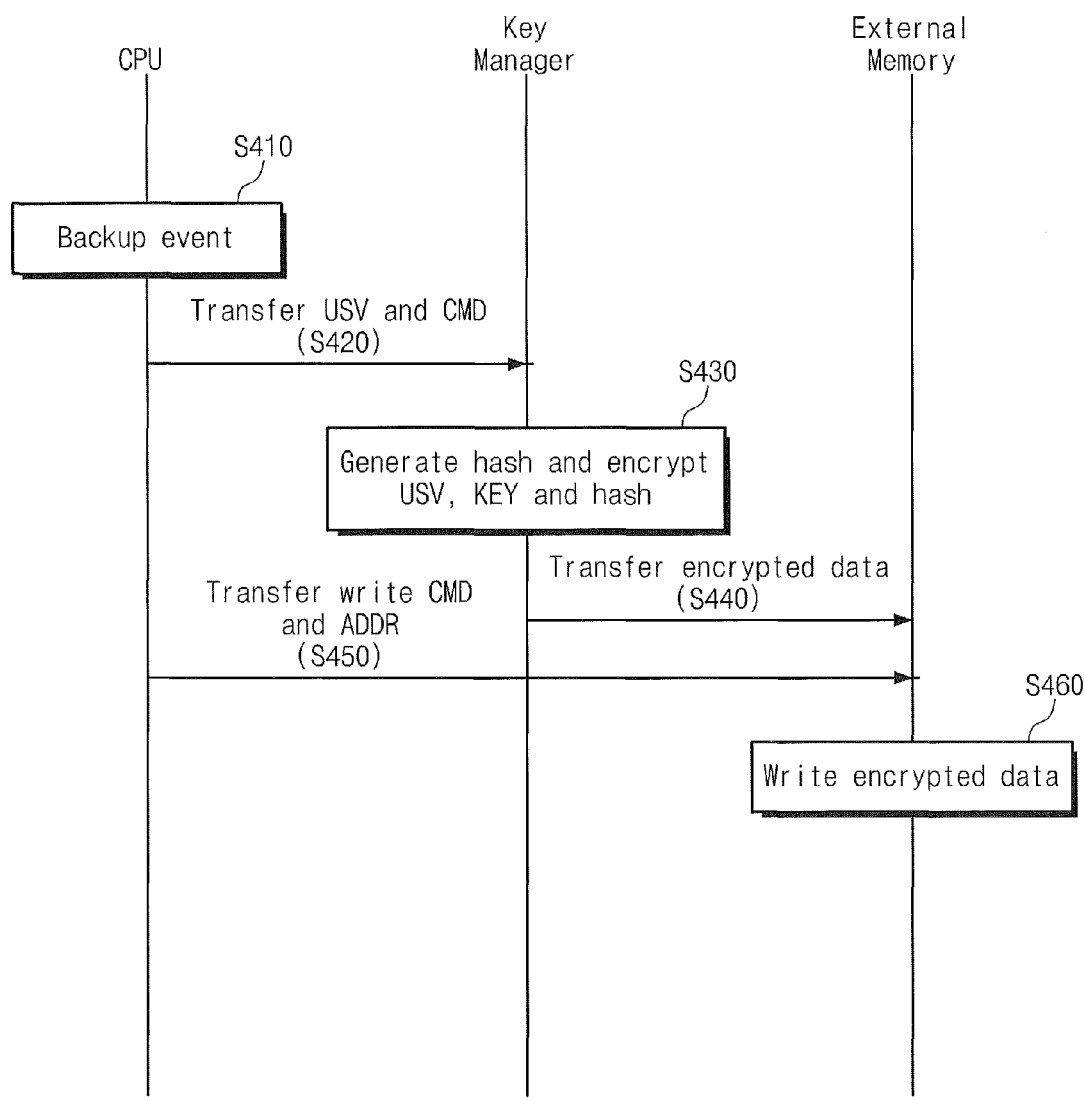
FIG. 14 is a flow chart schematically illustrating an operating method of a data processing system shown in FIG. 1, according to still another embodiment of the inventive concepts.

FIG. 14 is a flow chart schematically illustrating an operating method of a data processing system 10 shown in FIG. 1, according to still another embodiment of the inventive concepts. In FIG. 14, there is exemplarily illustrated a method where the data processing system 10 backs up a key KEY at an external memory 155 according to a second scheme.

Referring to FIGS. 1 and 14, in step S410, a backup event is issued. A backup event means such a situation that a backup of a key at the external memory 155 according to a second scheme is requested. For example, a backup event is issued by software (e.g., an operating system, an application, etc.) driven on a CPU 110 of the data processing system 10.

In step S420, the CPU 110 sends a user setting value USV and a command CMD to a key manager 120. The command CMD may be a command requesting a backup of a key KEY.

In step S430, the key manager 120 generates a hash using the user setting value USV and the key KEY. For example, the hash may be generated by a hash processor 240. The key manager 120 generates encrypted data by encrypting the user setting value USV, the key KEY, and the hash. The encryption may be performed by a block cipher processor 230.

In step S440, the key manager 120 sends encrypted data to the external memory 155.

In step S450, the CPU 110 sends a write command and an address to the external memory 155. Exemplarily, step S450 may be performed in parallel with at least one of steps S420 to S440. Or, step S450 may be performed before or after at least one of steps S420 to S440.

In another embodiment, the key manager 120 may output the key KEY to the CPU 110 instead of the external memory 155. The CPU 110 may send the key KEY with the write command and the address to the external memory 155.

In step S460, the external memory 155 writes the encrypted data at a location corresponding to an address received in step S450, in response to the write command received in step S450.

As described with reference to FIG. 14, keys generated and managed according to a second scheme are backed up through user certification based on a user setting value USV. Thus, since a key is not restored through an illegal means (e.g., hacking), security of a key is improved.

In FIG. 14, it is explained that the key KEY is backed up to the external memory 155. However, the key KEY may be backed up to an encrypted key memory 280 not the external memory 155. That is, the key KEY may be backed up internally at the key manager 120.

Figure 15:
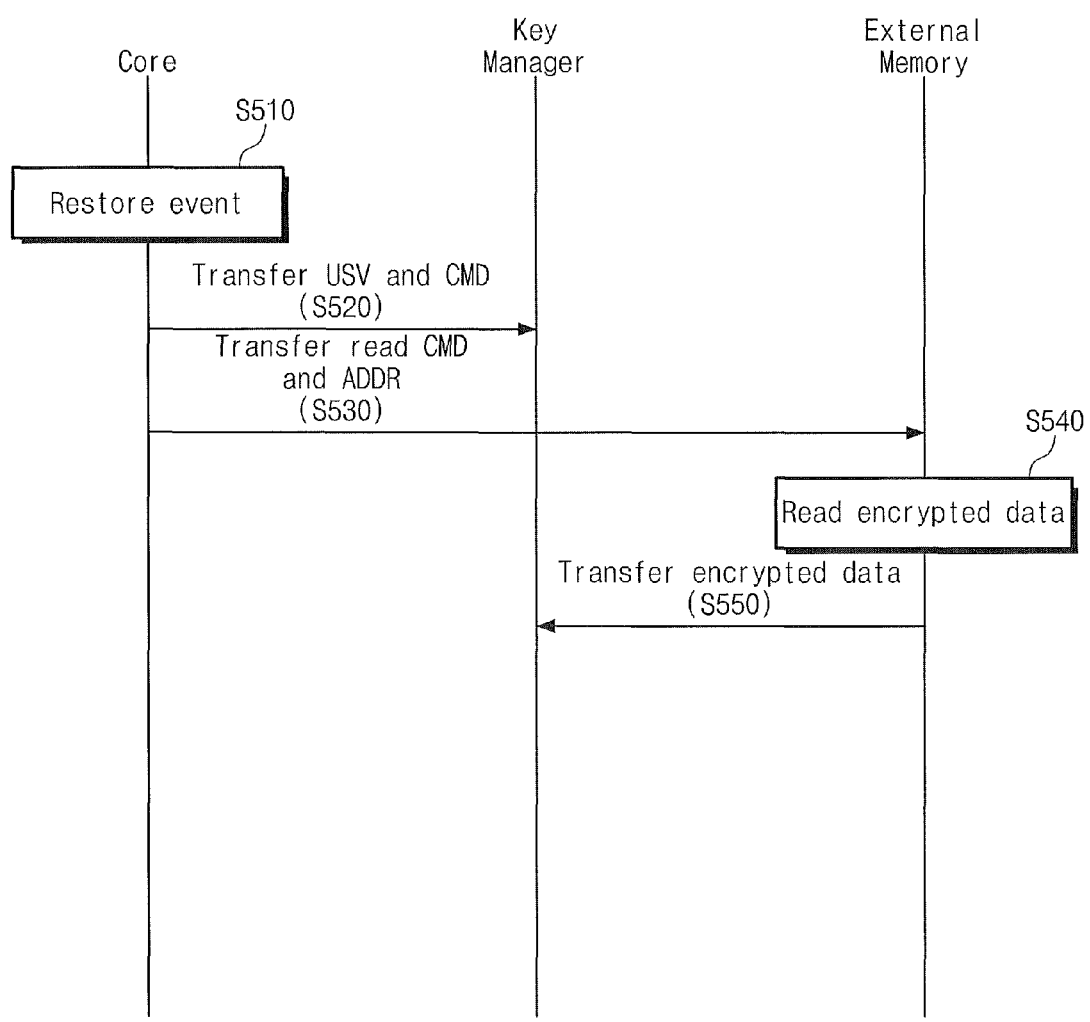
FIG. 15 is a flow chart schematically illustrating an operating method of a data processing system shown in FIG. 1, according to yet another embodiment of the inventive concepts.

FIG. 15 is a flow chart schematically illustrating an operating method of a data processing system 10 shown in FIG. 1, according to yet another embodiment of the inventive concepts. In FIG. 15, there is illustrated a method where the data processing system 10 restores a key from an external memory 155 according to a second scheme.

Referring to FIGS. 1 and 15, in step S510, a restore event is issued. A restore event means such a situation that restoring of a key KEY from an external memory 155 is requested according to a second scheme. For example, a restore event is issued by software (e.g., an operating system, an application, etc.) driven on a CPU 110 of the data processing system 10.

In step S520, the CPU 110 sends a user setting value USV and a command CMD to a key manager 120. The command CMD may be a command requesting a restoration of a key KEY.

In step S530, the CPU 110 sends a read command and an address to the external memory 155.

In step S540, the external memory 155 reads encrypted data from a location corresponding to an address received in step S530, in response to the read command received in step S530.

In step S550, the external memory 155 transfers the read data, that is, the encrypted data to the key manager 120.

In some embodiments, step S520 may be performed in parallel with at least one of steps S530 to S550. Or, step S520 may be performed before or after at least one of steps S530 to S550.

In another embodiment, the external memory 155 may output the encrypted data to the CPU 110 instead of the key manager 120. The CPU 110 may transfer the encrypted data to the key manager 120. The key manager 120 may decrypt the encrypted data and store them into a key memory 270.

As described with reference to FIG. 15, keys generated and managed according to a second scheme are restored through user certification based on a user setting value USV. Thus, since a key is not restored through an illegal means (e.g., hacking), security of a key may be improved.

In FIG. 15, it is explained that the key KEY is restored from the external memory 155. However, the key KEY may be restored from an encrypted key memory 280. That is, the key KEY may be restored internally at the encrypted key memory 120.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A system on chip, comprising:
a bus;
a central processing unit coupled to the bus and configured to communicate with an external component through the bus; and
a key manager coupled to the central processing unit, wherein the key manager includes:
a random number generator configured to generate a key; and
a key memory configured to store the key and a first user setting value associated with the key,
wherein the key manager is configured to directly output the key to the central processing unit not through the bus in response to a first command associated with the first user setting value from the central processing unit,
wherein the key manager is configured to generate an encrypted key based on the key and the first user setting value to output the encrypted key to the central processing unit in response to a second command from the central processing unit,
wherein the key manager is further configured to generate a hash value based on the key and the first user setting value, to generate the encrypted key by encrypting the hash value and the key using a fixed value unique to the system on chip, and to store the encrypted key in an encrypted key memory and wherein the key manager further comprises a unique value storage configured to provide the fixed value.

2. The system on chip of claim 1, wherein the key manager further comprises:
a user setting value register configured to store a second user setting value; and
a controller configured to control use of the key in response to a comparison of the first user setting value and the second user setting value.

3. The system on chip of claim 2, wherein the key memory comprises a decrypted key memory.

4. The system on chip of claim 1, wherein the fixed value is provided to a key manager core without traversing a host interface.

5. The system on chip of claim 3, wherein the key manager is further configured to generate the hash value based on a random salt value in addition to the key and the first user setting value, and to generate the encrypted key by encrypting the hash value, the key and the random salt value using the fixed value.

6. The system on chip of claim 5, wherein the key manager further comprises a cipher block configured to receive the hash value, the key, the random salt value, and the fixed value, and to generate the encrypted key by performing an encryption operation on the hash value, the key and the random salt value using the fixed value.

7. The system on chip of claim 5, wherein the key manager further comprises a hash generator configured to receive the random salt value, the first user setting value and the key, and to generate the hash value by performing a hash operation on the random salt value, the first user setting value and the key.

8. The system on chip of claim 1, wherein the key manager comprises a key manager core, and wherein the random number generator is configured to provide the key to the key manager core without traversing a host interface.

9. The system on chip of claim 2, wherein the key manager further comprises a user check block that compares the first user setting value and the second user setting value.

10. A method of operating a key manager in a system on chip, the method comprising:
generating and storing a key in a key memory;
storing a first user setting value in the key memory, wherein the first user setting value is associated with the key;
outputting the key to a host in response to a first command associated with the first user setting value from the host; and
generating an encrypted key based on the key and the first user setting value to output the encrypted key to the host in response to a second command from the host, wherein generating the encrypted key comprises:
generating a hash value based on the key and the first user setting value;
obtaining a fixed value unique to the system on chip from a unique value storage;
generating the encrypted key by encrypting the hash value and the key using the fixed value; and
storing the encrypted key in an encrypted key memory.

11. The method of claim 10, wherein the method further comprises:
receiving a second user setting value from a host;
comparing the first user setting value with a second user setting value; and
controlling use of the key based on a result of the comparison of the first user setting value and the second user setting value.

12. The method of claim 11, wherein the key memory comprises a decrypted key memory.

13. The method of claim 10, wherein the fixed value does not traverse a host interface.

14. The method of claim 12, wherein generating the hash value comprises generating the hash value based on a random salt value in addition to the key and the first user setting value, and
wherein generating the encrypted key comprises generating the encrypted key by encrypting the hash value, the key and the random salt value using the fixed value.

15. A key manager, comprising:
a key manager core including a controller, wherein the key manager core is configured to receive a user setting value;
a random number generator configured to generate a key; and
a decrypted key memory configured to store the key and the user setting value, wherein the user setting value is associated with the key,
wherein the key manager core is configured to generate a hash value based on the key, and the user setting value, to generate an encrypted key by encrypting the hash value and the key using a fixed value, and to store the encrypted key in an encrypted key memory, and wherein the key manager core is configured to output the key to a host in response to a first command associated with the user setting value from the host, and wherein the key manager core is configured to output the encrypted key to the host in response to a second command from the host.

16. The key manager of claim 15, wherein the random number generator is configured to provide the key to the key manager core without the key traversing a host interface.

17. The key manager of claim 16, wherein the fixed value is unique to a system on chip that includes the key manager.

18. The key manager of claim 16, wherein the key manager core is further configured to generate the hash value based on a random salt value in addition to the key and the user setting value, and to generate the encrypted key by encrypting the hash value, the key and the random salt value using the fixed value.

19. The key manager of claim 15, wherein the user setting value comprises a first user setting value; and wherein the key manager core is configured to receive a second user setting value, to compare the second user setting value to the first user setting value, and to control use of the key in response to the comparison of the first user setting value and the second user setting value.

* * * * *